United States Patent [19]
Kobayashi

[11] Patent Number: 5,592,507
[45] Date of Patent: Jan. 7, 1997

[54] INTERMEDIATE RELAY STATION OF A DIGITAL MICROWAVE COMMUNICATION SYSTEM USING SERVICE CHANNEL FOR MONITORING AND CONTROLLING SPACE AND/OR TIME DIVERSITY, HETERODYNE RELAY, PHASE CONTROL, FREQUENCY CONTROL, WITH PHASE SHIFT KEYING MODULATION

[75] Inventor: Kenzo Kobayashi, Kawasaki, Japan

[73] Assignee: Fujitsu Limited, Kawasaki, Japan

[21] Appl. No.: 529,416

[22] Filed: Sep. 18, 1995

Related U.S. Application Data

[63] Continuation of Ser. No. 86,827, Jul. 7, 1993, abandoned.

[30] Foreign Application Priority Data

Jul. 7, 1992 [JP] Japan .................................. 4-178725

[51] Int. Cl.$^6$ ................... H04B 3/36; H04B 7/17; H04B 17/02; H04B 27/00
[52] U.S. Cl. .................. 375/211; 340/425.1; 379/338; 455/7; 375/259; 375/362; 331/31
[58] Field of Search ........................... 375/211, 214, 375/216, 220, 260, 261, 267, 268, 269, 272, 273, 283, 299, 323, 324, 327, 340, 347, 349, 362, 356, 376, 259, 344, 339; 324/76.41; 331/22, 30, 31; 359/191; 370/39, 110.4, 74, 75, 76, 122, 121; 340/425.1; 379/338; 455/7, 13.1

[56] References Cited

U.S. PATENT DOCUMENTS

| | | | |
|---|---|---|---|
| 3,824,597 | 7/1974 | Berg | 343/204 |
| 3,860,870 | 1/1975 | Furuya | 325/3 |
| 4,121,217 | 10/1978 | Chen | 343/204 |

Primary Examiner—Wellington Chin
Assistant Examiner—William Luther
Attorney, Agent, or Firm—Staas & Halsey

[57] ABSTRACT

A microwave digital communication system PSK-modulates a microwave carrier by using a main signal and, further, frequency-modulates it by using a service channel (SC) signal for monitoring and controlling the system. An intermediate relay station employing a space diversity reception system converts a received microwave into an intermediate frequency (IF) to extract the SC signal, and converts the IF signal into a microwave to transmit, thus performing heterodyne relay. The intermediate relay station generates a phase error signal corresponding to the frequency deviation of the IF received signal, by using the IF received signal and an IF reference signal having a fixed frequency equal to the carrier frequency of the IF received signal, and extracts the phase error signal as an SC signal. The SC signal is inputted as a control signal to a VCO for generating a receiving-side local oscillation signal so that the frequency of that follows the variation of the frequency deviation of the received microwave. Thereby, the IF received signal is phase-locked by the IF reference signal, thus suppressing the frequency modulation component of the IF received signal caused by the SC signal. Because the intermediate relay station causes no increase in the frequency modulation factor while adding an SC signal, this relay station facilitates easily regeneration of the carrier performed by the receiving terminal station.

11 Claims, 6 Drawing Sheets

1

INTERMEDIATE RELAY STATION OF A DIGITAL MICROWAVE COMMUNICATION SYSTEM USING SERVICE CHANNEL FOR MONITORING AND CONTROLLING SPACE AND/OR TIME DIVERSITY, HETERODYNE RELAY, PHASE CONTROL, FREQUENCY CONTROL, WITH PHASE SHIFT KEYING MODULATION

This application is a continuation of application Ser. No. 08/086,827, filed Jul. 7, 1993, now abandoned.

BACKGROUND OF THE INVENTION

1. Field of the Invention

The present invention relates to an intermediate relay station and, more particularly, to an intermediate relay station which employs a heterodyne relay system and drops and inserts a frequency-modulated SC signal (service channel signal).

2. Description of the Related Art

A microwave communication system employing transmitting and receiving terminal stations and intermediate relay stations therebetween needs to transmit a service channel signal (hereinafter, referred to as an SC signal), besides a main signal, in order to monitor and control the intermediate relay stations.

An intermediate relay station in a heterodyne-relay microwave communication system relays a main signal as follows: an intermediate relay station converts a microwave received from the preceding station into an intermediate frequency, and then converts the intermediate frequency into a microwave to transmit to the succeeding station.

This system does not regenerate data by converting a main signal into a baseband signal and, therefore, is also called a non-regenerative relay system. To monitor and control the intermediate relay stations, this system needs to drop or insert, at the intermediate relay stations, a monitor/control signal, called an SC signal, that is sent from the preceding station, without resorting to the main signal. Therefore, the intermediate relay stations of this system are provided with means for extracting and adding an SC signal. The transmitting terminal station superposes an SC signal by frequency-modulation onto a microwave carrier which has been PSK-modulated by digital signals of a main signal. When receiving the microwave, each intermediate relay station converts the microwave into an intermediate frequency signal (an IF received signal) in order to extract an SC signal, which is then used for a predetermined purpose. Each intermediate relay station adds a new SC signal (which may include a part of the extracted SC signal at that station) to the microwave by frequency modulation during conversion of the IF received signal into a sending microwave signal. The IF received signal used for the frequency modulation contains a frequency-modulation component corresponding to the SC signal added by the preceding station, as well as a PSK-modulation component corresponding to the main signal. Therefore, if each intermediate relay station directly uses such an IF received signal for conversion into a sending microwave, the frequency modulation (FM) factor of the microwave is increased by the SC signal added by each intermediate relay station. In other words, as the microwave is relayed by the plurality of intermediate relay stations to the receiving terminal station, the FM factor and the frequency deviation of the microwave carrier become greater. Although the intermediate relay stations and the receiving terminal station each have a PLL (phase-locked loop) function for carrier regeneration and data demodulation, the PLL function fails to perform, undesirably if the frequency deviation of the microwave received is excessively increased, thus making carrier regeneration or the like difficult.

In many cases adopting the above mentioned communication system, the intermediate relay stations employ the SD(space diversity) reception system which combines waves received through two radiowave propagation paths, in order to enhance the received signal which has been degraded by variation of the radiowave propagation characteristics, such as fading. Such intermediate relay stations should also be able to optimally combine two separately-received waves, transmit an SC signal having a sufficiently large bandwidth and add no FM factor increment.

SUMMARY OF THE INVENTION

Accordingly, an object of the present invention is to provide an intermediate relay station which employs an SD reception system and adds an SC signal to a received microwave by frequency modulation without increasing the frequency deviation of the microwave carrier to be transmitted compared with the frequency deviation of the microwave carrier received.

Another object of the present invention is to provide an intermediate relay station which employs an SD reception system, and substantially prevents an increase in the frequency deviation of the microwave carrier, and provides a sufficiently wide SC signal band.

To achieve the above objects, one aspect of the present invention provides an intermediate relay station of a microwave communication system which uses a microwave carrier that is modulated by a main signal being transmitted and, further, frequency-modulated by a service channel signal for supervisory controlling the microwave communication system, and which comprises a plurality of intermediate relay stations for relaying the main signal by heterodyne relay, the intermediate relay station comprising: a pair of receiving mixer means for frequency-converting two received microwave signals received by two antennas apart from each other, each of the two microwave signals containing a frequency modulation component, into two intermediate frequency received signals, respectively, by using a receiving-side local signal; phase shifter means for shifting the phase of one of the two intermediate frequency received signals based on a space diversity control signal; combining means for combining the intermediate frequency received signal whose phase has been shifted and the other intermediate frequency received signal into an intermediate frequency received signal; space diversity control means for generating a space diversity signal for controlling the phase shifter means so that the two intermediate frequency received signals that are to be inputted to the combining means have a predetermined phase relation, by using the intermediate frequency received signal from the combining means; fixed-frequency oscillating means for generating an intermediate frequency reference signal having a fixed frequency equal to a frequency of a carrier of the intermediate frequency received signal; phase difference detecting means for inputting the intermediate frequency reference signal and the intermediate frequency received signal, and for generating a control signal corresponding to a phase difference between the intermediate frequency reference signal and the intermediate frequency received signal; a VCO device for, under the control of the control signal, generating the receiving-side local signal whose frequency varies so as to reduce a frequency modulation component contained in each of the intermediate frequency received signals outputted from the pair of receiving mixer means; service channel signal extracting means for outputting the control signal as the service channel signal; and transmitting mixer means for converting the intermediate frequency signal in which an frequency modulation component has been reduced, into a transmitting microwave.

Because the above-described intermediate relay station suppresses the frequency modulation components caused by the service channel signals superposed onto the intermediate frequency received signal and sends such an intermediate frequency signal to the transmitting mixer, the frequency modulation factor of the transmitting microwave will not increase while the transmitting mixer adds a new service channel signal. Therefore, if a large number of such intermediate relay stations are employed to relay a microwave to a receiving terminal station, the frequency deviation of the microwave carrier received by the receiving terminal station can be restricted within a desirably small range, thus facilitating simplification of carrier regenerating means.

Thus, the intermediate relay station employing a space diversity reception system is also able to suppress frequency modulation components and extract service channel signals.

A further aspect of the present invention provides an intermediate relay station wherein a space diversity (SD) controlling loop is formed in a first intermediate frequency (IF) stage, a PLL using a second IF signal controls a local oscillation signal for converting the combined first IF signal resulting from the SD combination, into a second IF signal. In other words, PLL means for suppressing frequency modulation components and demodulating service channel (SC) signals is provided in a stage succeeding the SD reception control loop. In such a construction, because the loops can be individually optimized, an intermediate relay station of the SD reception system is also able to eliminate an increase in the frequency modulation components and provide a sufficiently wide SC signal band.

DETAILED DESCRIPTION OF THE PREFERRED EMBODIMENTS

Before describing the preferred embodiments of the present invention, a conventional intermediate relay station of a microwave communication system for transmitting a frequency-modulated SC signal will be described with reference to FIGS. 1 through 3.

Figure 1:
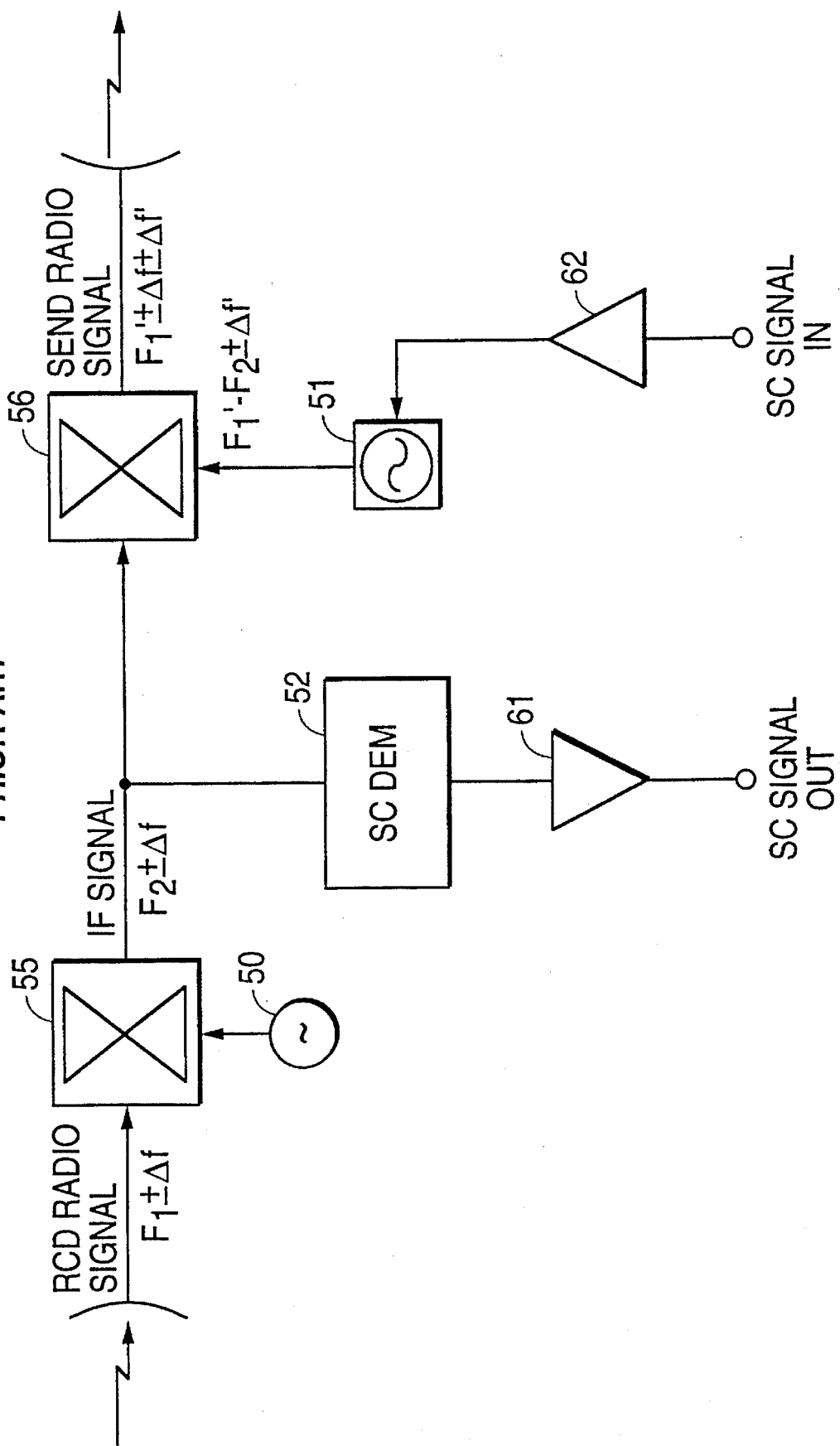
FIG. 1 is a block diagram of a conventional intermediate relay station.

A conventional intermediate relay station as shown in FIG. 1 converts a received microwave signal into an IF received signal and branches the IF received signal to extract an SC signal. An SC signal from this intermediate station to the succeeding station or the receiving terminal station is inserted by frequency-modulation on the sending microwave by varying, in response to the SC signal voltage, the oscillation frequency of the sending-side local oscillator.

The microwave signal received by the intermediate relay station has a carrier frequency F1 and has been 4-phase PSK-modulated by a transmitting main signal and, further, frequency-modulated by $\pm \Delta f$ by the Sc signal.

A receiving mixer 55 converts the received microwave signal having a frequency of $F1 \pm \Delta f$ into an IF received signal having a frequency of $F2 \pm \Delta f$ by using a receiving-side local oscillation signal having a fixed frequency of $F1-F2$ from a receiving-side local oscillator 50. The IF received signal is branched into two signals. One of the signals is sent to the transmitting mixer 56, and the other is inputted to an SC demodulator 52 for demodulating an SC signal.

The transmitting mixer 56 converts the inputted IF received signal into a sending signal having a microwave transmission frequency F1' by using a transmitting-side local oscillation signal from a microwave transmitting-side local oscillator 51, and transmits such a signal to the succeeding station.

Figure 2:
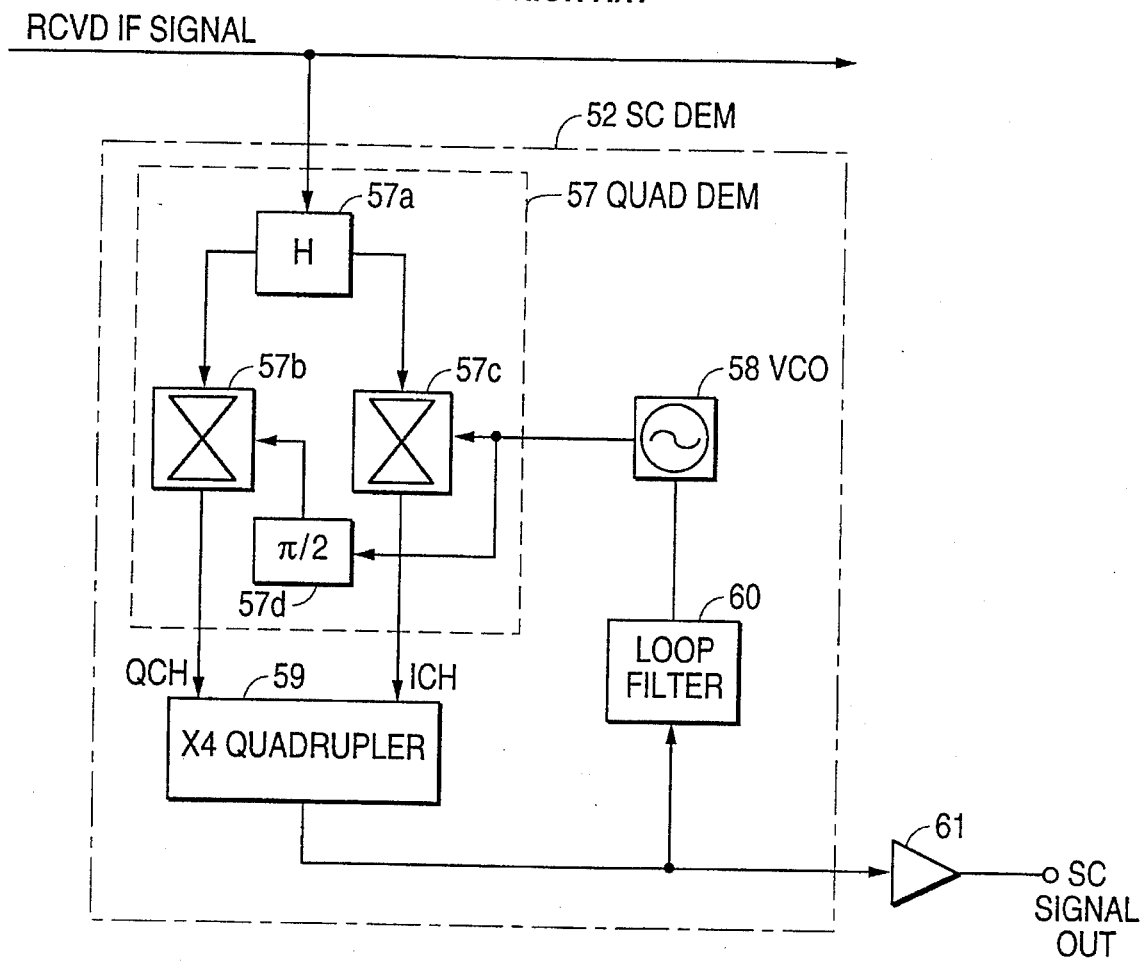
FIG. 2 illustrates a conventional SC signal demodulator.

Referring to FIG. 2, the SC demodulator 52 is a widely known PLL (Phase locked loop) for frequency-demodulating by performing carrier regeneration and comprises a quadrature demodulator 57, a VCO 58 for regenerating an IF carrier signal, a frequency quadrupler 59 and a loop filter 60.

The quadrature demodulator 57 is composed of a branching circuit 57a, two multiplication mixers 57b, 57c, and a $\pi/2$ phase shifter 57d. The branching circuit 57a separates an IF received signal into two branches and sends them to the mixers 57b and 57c, respectively. The VCO 58 sends IF carrier signals to the mixers 57b and 57c as the phase reference signals. The phase of the IF carrier signal for the mixer 57c is $\pi/2$-shifted by the $\pi/2$ phase shifter 57d. The mixers 57b, 57c output to two channels, Channel I and Channel Q, respectively, baseband output voltages proportional to the cosine and to the sine of the phase differences between the corresponding regenerated IF carrier signals and the IF received signals inputted thereto. The output signals to the two channels contain components corresponding to the $\pi/2 \times N$ phase shift based on the 4-PSK modulation (digitized 4-phase shift keying modulation) of the main signal, and phase error components based on the frequency deviation due to the frequency modulation of the SC signal. To extract the components corresponding to the phase error caused only by frequency modulation components from the two-channel baseband signals, the SC demodulator 52 employs a PSK component removing method using the frequency quadrupler 59, widely known as the Costas method. Because the frequency quadrupler 59 quadruples the frequency of the baseband signals inputted through the two channels from the quadrature demodulator 59, the components corresponding to the $\pi/2 \times N$ phase shift based on the 4PSK modulation are converted into components of $2\pi \times N$ and thus removed. As a result, the output of the quadrupler circuit 59 has only the output components corresponding to the phase error caused by the frequency modulation.

The output from the quadrupler circuit 59 is supplied to the VCO 58 as a control signal via the loop filter 60, that is, a low-pass filter. The VCO 58, controlled by the control signal, regenerates a carrier by changing its oscillation frequency in accordance with the frequency of the inputted IF received signal.

As is widely known, the oscillation frequency of a VCO contained in a phase-locked loop (PLL) varies in accordance with the frequency of the signal inputted to the PLL. The level of control voltage supplied to the VCO is proportional to the amount of the phase shift of the inputted signal. In the PLL constituting the SC demodulator 52 shown in FIG. 2, the control voltage is the frequency-modulation components contained in the IF received signal inputted to the SC demodulator 52, that is, the SC signal. Therefore, the SC signal can be dropped to the intermediate relay station by branching the control voltage from the loop filter 60 and extracting it by means of an SC signal extracting unit 61 composed of an amplifier and a filter.

To insert an SC signal into the IF received signal as shown in FIG. 1, the SC signal to be transmitted is inputted to the microwave transmitting-side local oscillator 51 via an SC signal inserting unit 62. The transmitting-side local frequency is oscillated by ±Δf by using the SC signal. Using this transmitting-side local frequency, the transmitting mixer 56 further frequency-modulates the microwave carrier and transmits it to the succeeding station.

In the above-described conventional intermediate relay station, the transmitting mixer 56 receives an IF received signal having a frequency deviation ±Δf caused by the frequency modulation based on the SC signals added by the stations preceding the intermediate relay station. Then, the transmitting mixer 56 further frequency-modulates the IF received signal by ±Δf by using the SC signal inserted by this intermediate relay station while converting the IF received signal into a transmitting microwave signal. Thus, the frequency modulation factor of the microwave carrier is increased by each intermediate relay station.

In other words, a station nearer to the receiving terminal station receives a microwave signal having a greater frequency modulation factor, that is, a greater frequency deviation. When the microwave signal reaches the receiving terminal station having a PLL thereof for main signal demodulation and carrier regeneration, the frequency deviation of the microwave signal has become too large for the PLL to process, thus failing to correctly regenerate the carrier and the main signal. Naturally, the nearer an intermediate relay station is to the receiving terminal station, the more difficult it becomes to perform frequency demodulation.

In order to eliminate the above-stated problems, the intermediate relay station of non-SD reception system was offered by the present inventor (Japanese laid open patent application No.H2-277328 of Kobayashi). This type of intermediate relay station will be described hereinafter with reference to FIG. 3.

Figure 3:
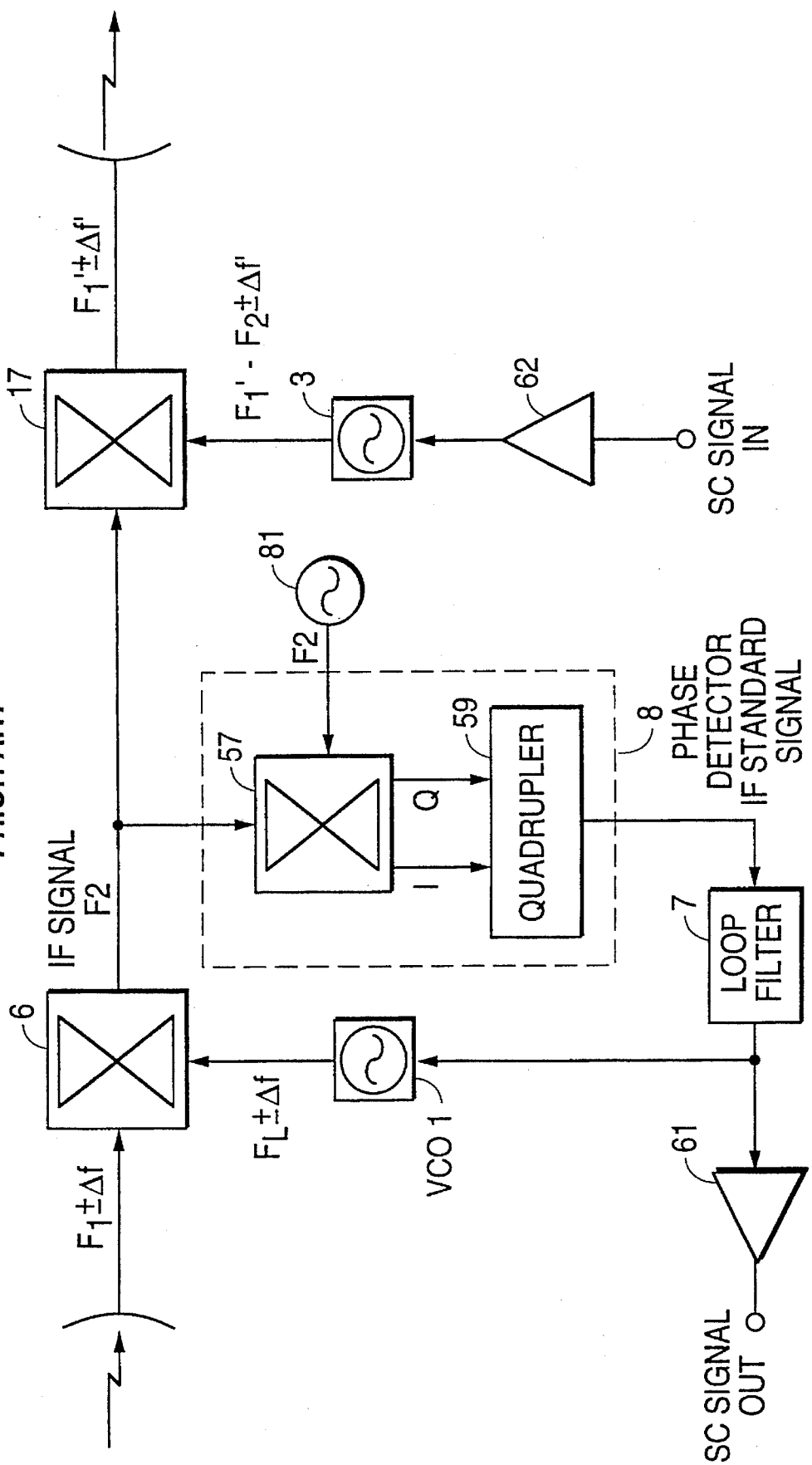
FIG. 3 is a block diagram of a conventional intermediate relay station not employing the space diversity reception system.

An intermediate relay station as shown in FIG. 3 is suitable for a digital multiplex microwave communication system which uses 4-PSK modulation to transmit a main signal. The intermediate relay station of this type uses the heterodyne relay system to relay a main signal and drop/insert an SC signal for monitoring and controlling intermediate relay stations.

The description of this intermediate station will be given on the assumption that the microwave carrier signal having a frequency F1 in, for example, an 11 GHz band, which received from the preceding station has been 4PSK-modulated by main signal data having a data rate of 50 Mbits/sec and a symbol rate of 25 Mbits/sec, and has been frequency-modulated by an SC signal having a bandwidth of 16 KHz for 4 channels, that is, 4 KHz per a channel. It is further assumed that due to the frequency modulation, the received microwave normally has a frequency deviation of 20 KHz.rms.

Referring to FIG. 3, a receiving mixer 6 converts a received microwave having a carrier frequency F1 into an IF received signal having an intermediate frequency F2 (=70 MHz).

A receiving-side local oscillator 1 is composed of a VCO which varies its oscillation frequency in accordance with control voltage. The receiving-side local oscillator 1 generates a receiving local oscillation signal FL whose frequency varies around a center frequency F1–F2 equal to the difference between the carrier frequency F1 of the received microwave and the intermediate frequency F2 of the IF received signal, and sends such a signal to the receiving mixer 6. The IF received signal from the receiving mixer 6 is branched into two signals: one is inputted to a transmitting mixer 17; and the other is inputted to a phase difference detecting circuit 8 for SC signal demodulation.

The phase difference detecting circuit 8 is composed of a fixed-frequency oscillator 81, a quadrature demodulator 57 and a frequency quadrupler 59, and outputs a voltage corresponding to the phase difference between the IF received signal inputted thereto and an IF reference signal. The oscillator 81 supplies the quadrature demodulator 57 with a fixed-frequency IF reference signal having an intermediate frequency of F2(=70 MHz). The quadrature demodulator 57 multiplies the IF received signal by the fixed-frequency IF reference signal to output two-channel baseband demodulation signals corresponding to the phase differences between the IF received signal and the two phase reference signals having a phase difference of π/2. The quadrature demodulator 57 and the frequency quadrupler 59 are generally the same as described with reference to FIG. 2, and detail description thereof will not be repeated. A main difference from the conventional art shown in FIG. 2 is that the reference phase signal according to this embodiment is the IF reference signal having a fixed frequency F2 equal to the center frequency of the frequency-modulated IF received signal while the reference phase signal according to the conventional art shown in FIG. 2 is the regenerated IF carrier from the VCO which follows the variation of the frequency of the IF received signal. As a result, the phase difference detecting circuit 8 removes phase shift components of multiplications of π/2 by N caused by the 4PSK modulation using the main data, and outputs only the components corresponding to the phase difference between the IF reference signal and the IF received signal caused specifically by the frequency-modulation components. This phase error signal based on frequency modulation is inputted to the receiving-side local oscillator 1 as a control signal via a loop filter 7 composed of, for example, a low-pass filter having a cut-off frequency of 500 KHz. The control signal varies in accordance with the variation of the phase error between the IF reference signal and the IF received signal, and changes the frequency of the receiving-side local oscillator 1 so that the phase difference between the two IF signals is reduced.

In the construction as described above, the combination of the receiving mixer 6, the phase difference detecting circuit 8, the loop filter 7 and the receiving-side local oscillator 1 forms a PLL. When the PLL is locked, the receiving-side local oscillator 1 generates a frequency change equal to the frequency change of the received microwave signal, thus equalizing the frequency of the IF received signal from the receiving mixer 6 to the oscillation frequency F2 of the fixed-frequency IF oscillator 81. Therefore, because the frequency-modulation components of the IF received signal sent to the transmitting mixer 17 is suppressed, the IF signal to be transmitted to the succeeding station becomes an IF signal having a very small frequency deviation and only the N×π/2 phase shift component caused by 4PSK modulation.

During this process, the value of the control signal applied to the receiving-side local oscillator 1 varies proportionally to the amount of variation in its oscillation frequency. Because the oscillation frequency varies in accordance with the frequency variation of the received microwave, the control signal becomes equal to the demodulated frequency-modulation component contained in the received microwave signal.

The intermediate relay station extracts the SC signal by a specific method and uses a certain channel of it in a specific manner, and employs an SC inserting unit 62 to convert the SC signals of the other channels and an SC signal to be inserted newly by that station into a predetermined frequency band and applies the signals to a transmitting-side local oscillator 3. The transmitting-side local oscillator 3 is composed of a VCO which generates a transmitting-side local signal having a center frequency equal to the difference between the transmitting microwave frequency and the IF frequency. Because the frequency of the transmitting side local signal is controlled by the SC signal from the SC signal inserting unit 62 so as to vary around the center frequency, the transmitting mixer 17 outputs to the succeeding station a microwave signal that has been frequency-modulated only by the SC signal added by the intermediate relay station.

The above-described FM component suppressing concept is for the intermediate relay station not adopting any space diversity reception method. In many cases, the intermediate relay stations employ the space diversity(SD) reception system in order to enhance a received signal. The intermediate station of SD reception type also has similar problem of the increase of the carrier frequency deviation.

The present invention eliminates the above-stated problem occurred in an intermediate relay station employing a space diversity reception system, by applying the FM component suppression concept.

The space diversity (SD) reception system employs two separate radio receiving channels to receive two microwaves having a phase difference caused by the difference between the travel distances thereof, converts the microwaves into IF signals, and then combines the two signals so as to eliminate the effects of fading of the radio propagation path.

The preferred embodiments of the intermediate relay station of the present invention will now be described hereinafter with reference to FIGS. 3 through 6. In FIG. 3 to 6, the same reference numerals as in FIGS. 1 through 3 designate the same component parts as in FIGS. 1 through 3, and the same assumption for the signal frequencies or such is applicable for the descriptions of those embodiments.

A first embodiment of the present invention will be described hereinafter with reference to FIG. 4.

In the first embodiment, the frequency-modulation SC signal transmission system is applied to the digital microwave multiplex transmission system employing the space diversity reception system.

Figure 4:
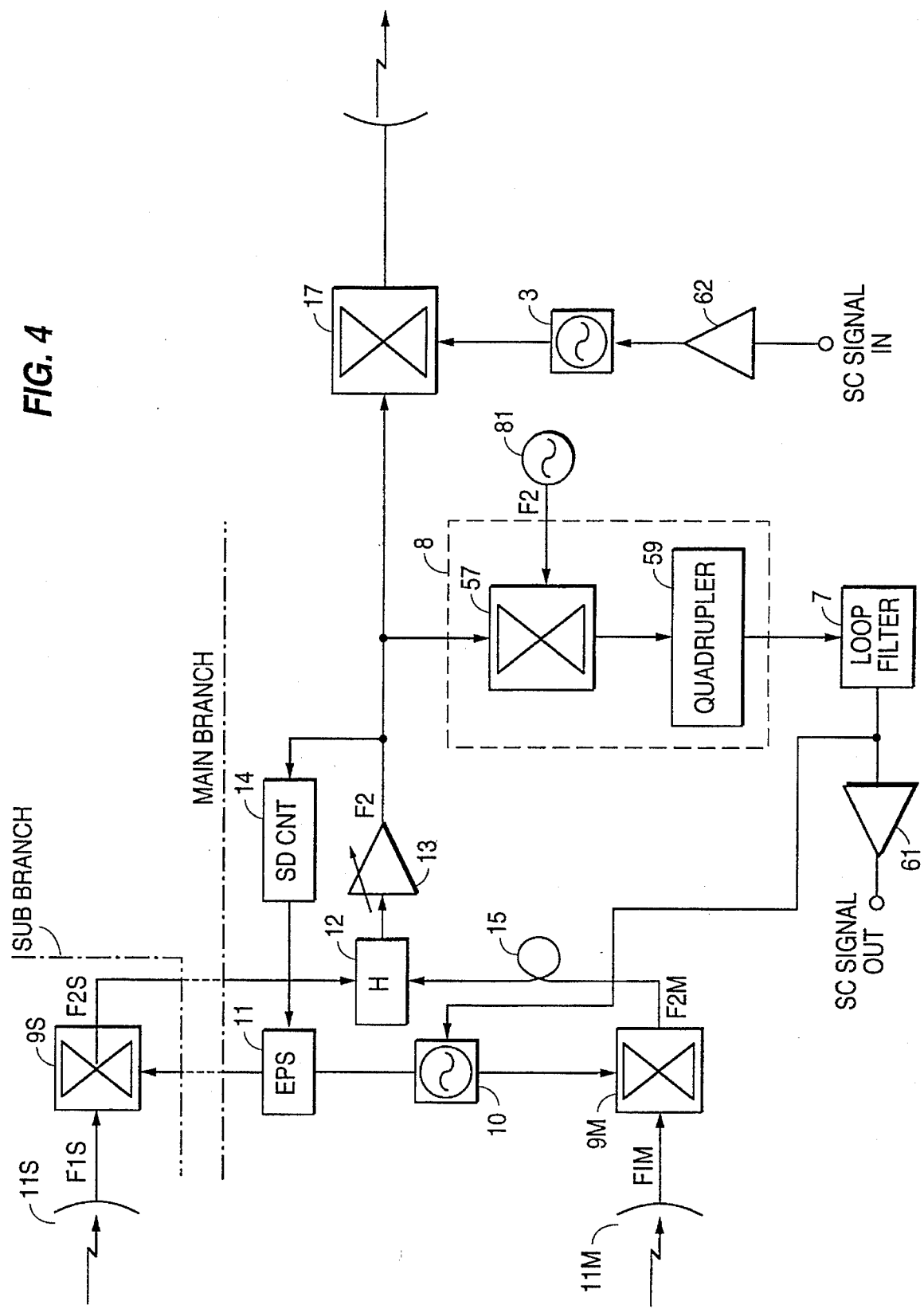
FIG. 4 illustrates the construction of a first embodiment of the intermediate relay station of the present invention employing the SD reception system.

Refferring to FIG. 4, the microwave from the preceding station is received by two antennas 11M, 11S spaced by several hundred meters. Mixers 9M, 9S provided near the antennas 11M, 11S convert the received microwave having a earlier frequency F1 into M-branch (main branch) and S-branch (sub branch) IF received signals F2M, F2S having an IF frequency F2 (=70 MHz), respectively, by using a local oscillation signal from a receiving-side local oscillator 10. The receiving-side local oscillator 10, composed of a VCO, is controlled by a control signal described later so as to vary its oscillation frequency in accordance with the frequency variation of the received microwave and generate a local oscillation signal whose frequency always equals the difference between the received microwave frequency and the intermediate frequency. The receiving-side local oscillation signal from the receiving-side local oscillator 10 is branched into two, which are then sent to the receiving mixers 9M, 9S. One of the signals is sent directly thereto, and the other is sent via an endless phase shifter 11. Using the local oscillation signals, the receiving mixers 9M, 9S convert the received microwave into IF received signals having a frequency equal to the difference between the received microwave frequency and the local oscillation frequency, and outputs the IF received signals to a hybrid combiner 12. The hybrid combiner 12 combines the IF received signals from the receiving mixers 9M, 9S and outputs the resultant signal. Because an S-branch receiver unit composed of the antenna 11S and the mixer 9S and an M-branch receiver unit similarly composed are separated by several hundred meters, the delay times caused by the transmission paths of the two IF signals from the mixers to the hybrid combiner 12 need to be the same in order to achieve good SD reception effects. To equalize the delay times of the two IF received signals, the M-branch, closer to the hybrid combiner 12, is provided with, for example, a delay device 15 for achieving a delay time of some 100 ns.

An SD control unit 13 takes up an IF received signal F2 outputted by an AGC amplifier 13 which controls its output at a constant level, and sends a control signal to the endless phase shifter 11, so as to make the two IF signals F2M, F2S to the hybrid combiner 12, for example, in phase if in-phase combining system is to be adopted as the combining system.

After the received signal F2 from the hybrid combiner 12 is adjusted by the AGC amplifier 13 to a constant level, the signal F2 is branched into three branches: one is sent to the SD control unit 14; another to a transmitting mixer 17; and the other to a phase difference detecting circuit 8. Similar to the prior art, the phase difference detecting circuit 8 in the first embodiment comprises a quadrature demodulator 57 and a frequency quadrupler 59, and performs quadrature demodulation and quadruplication as described above by using an IF reference signal from a fixed-frequency oscillator 81, the IF reference signal having a frequency F2 equal to the frequency of the IF received signal. The phase difference detecting circuit 8 thus provides an output corresponding to the phase difference between the IF received signal and the IF reference signal. The output from the phase error detecting circuit 8 contains only the phase error components caused by frequency modulation using SC signals. This output is inputted, as a control signal, to an IF local oscillator 10 composed of a VCO, via a loop filter 7. The IF local oscillator 10, controlled by the control signal, changes its oscillation frequency so as to suppress the frequency deviation of the IF received signal.

This arrangement of the component parts forms a PLL for equalizing the frequency of the IF received signals outputted by the mixers 9S, 9M to the frequency of the IF reference signal. When the PLL is locked, the frequency-modulation (FM) components caused by SC signals are removed from the IF received signal outputted by the hybrid combiner 12.

Because the VCO control signal from the loop filter (low-pass filter) 7 is also an SC signal which varies in accordance with the FM components of the microwave received signal, the SC signals from the preceding stations can be dropped at this intermediate relay station by extracting the VCO control signal by means of an SC signal extracting unit 61.

Further, because this embodiment has an SD control loop for combining two microwave received signals in a predetermined manner, this embodiment is able to enhance signals received by the SD reception system.

In the first embodiment, the loop of the PLL for suppressing FM components contains a signal transmission path causing a delay time of several hundred nanoseconds, that is, the signal transmission path from the S-branch receiving mixer to the hybrid combiner contained in the M-branch receiver which is several hundred meters apart from the S-branch receiver. Therefore, this delay time degrades the followability of the PLL, and reduces the available frequency-modulation frequency bandwidth, that is, the bandwidth for SC signals, compared with the non-SD type relay station in FIG. 3, which does not have such a long delay time. More specifically, while the band available for SC signals in FIG. 3 has four channels and a bandwidth of 16 KHz, the band available for SC signals in the first embodiment has only two channels and a bandwidth of 8 KHz.

The IF signal in which the FM components added by the preceding stations are suppressed is sent to the transmitting mixer 17, which converts the IF signal into a microwave signal by using a local signal from a transmitting-side local oscillator 3 composed of a VCO, the frequency of which varies in response to the voltage level of an SC signal, and transmits the microwave signal to the succeeding station.

Figure 5:
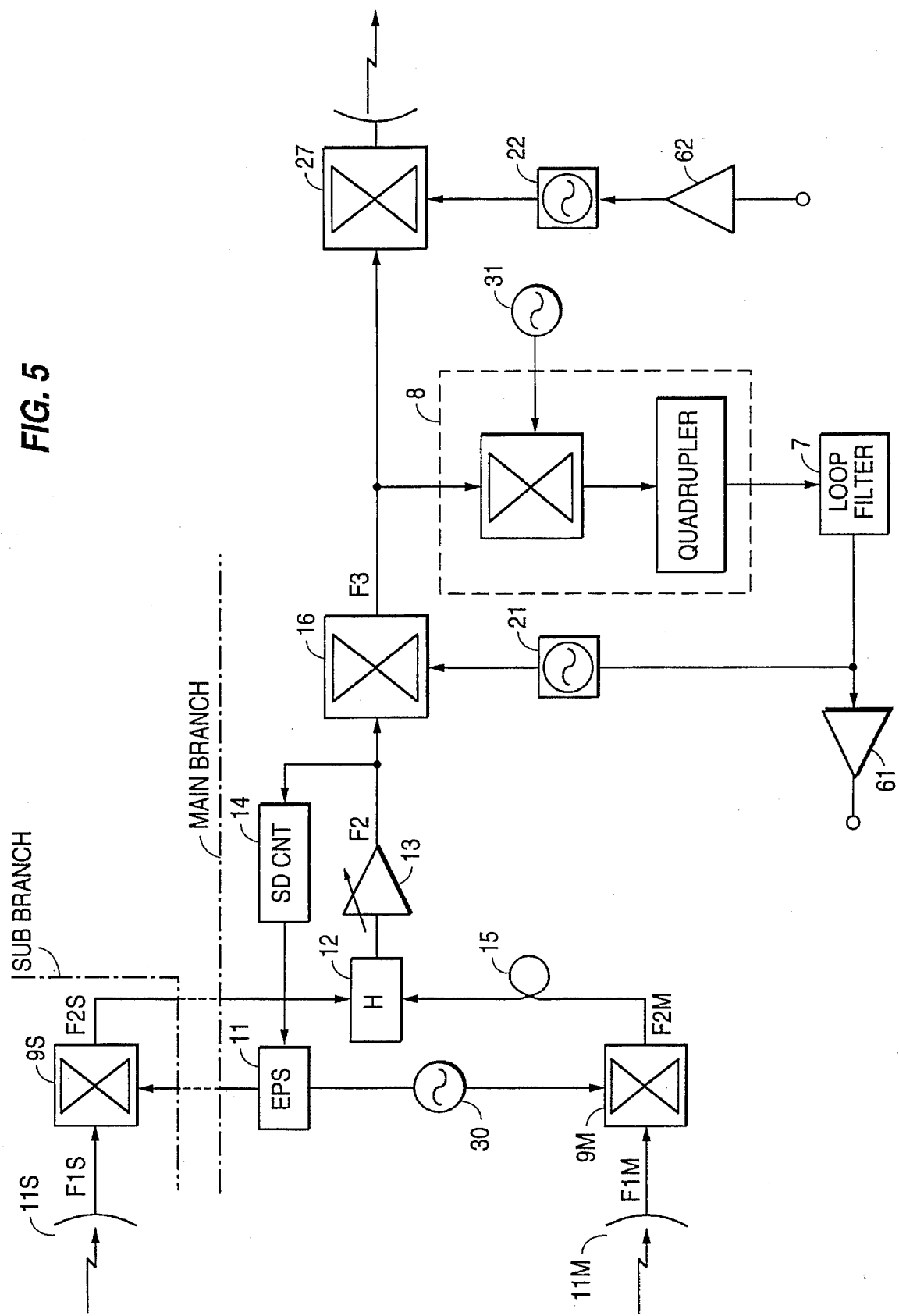
FIG. 5 illustrates the construction of a second embodiment of the intermediate relay station of the present invention employing the SD reception system.

FIG. 5 illustrates a second embodiment achieved based on the first embodiment so as to provide a sufficiently large bandwidth available for SC signals in an SD reception system.

This embodiment further comprises a second receiving mixer 16 for converting a first IF received signal, which is outputted by a hybrid combiner 12 and has a frequency F2, into a second IF received signal having a frequency F3 different from the frequency F2 of the first IF received signal. The frequency F3 of the second IF received signal is maintained at a constant level because the PLL controls a second receiving-side local oscillation signal which is then used by the second receiving mixer 16.

In the second embodiment as shown in FIG. 5, the component parts of the SD control loop and the operation thereof are generally the same as in the first embodiment, except that the SD control loop of the second embodiment employs, as a first local oscillator, a fixed-frequency oscillator instead of the VCO. A first local oscillator 30 composed of a fixed-frequency oscillator generates a local signal having a fixed frequency equal to the difference between the received microwave frequency and the first intermediate frequency F2.

Because first receiving mixers 9M, 9S use local oscillation signals having a fixed frequency for frequency conversion of the received microwaves F1M and F1S, first IF received signals F2M, F2S outputted by the first receiving mixers 9M, 9S contain unsuppressed FM components and a frequency deviation equal to that of the received microwaves. A first IF signal F2 resulting from the first IF received signals F2M, F2S also contains the FM components. After an AGC amplifier 13 adjusts the first IF signal F2 to a constant level, the second receiving mixer 16 frequency-converts the first IF signal F2 into the second IF signal F3 by using a local oscillation signal from a second receiving-side local oscillator 21. The second IF received signal from the second receiving-side mixer 16 is branched into two: one is sent to a transmitting mixer 27; and the other is sent to a phase difference detecting circuit 8 for SC signal demodulation. The phase difference detecting circuit 8 also receives a second IF reference signal from a fixed-frequency oscillator 31, whose frequency F3 is same as the second IF received signal. The phase difference detecting circuit 8 generates a control signal specifically corresponding to the phase shift components caused by frequency modulation using SC signals by generally the same manner as in the first embodiment. The output from the phase difference detecting circuit 8 is inputted, as a control voltage, to the second receiving-side local oscillator 21, which is a VCO, via a loop filter 7. Thereby, the second receiving-side local oscillator 21 changes its oscillating frequency so as to suppress the frequency deviation of the second IF received signal.

In this embodiment, the second receiving mixer 16 frequency-converts the first IF received signal resulting from the SD combination of the two first IF signals into the second IF. Further, the PLL for suppressing the FM components and extracting SC signals is formed in a circuitry portion succeeding the second receiving mixer 16. Thereby, the frequency of the second IF received signal is equalized to the fixed frequency of the reference signal oscillator 31, and the frequency deviation caused by SC signals can be eliminated. Similar to the first embodiment, the SC signals from the preceding stations can be dropped at this intermediate relay station by extracting the VCO control signal, that is, the output from the loop filter (low-pass filter) 7, by means of an SC signal extracting unit 61.

The second IF received signal in which the FM components added by the preceding stations are suppressed is sent to the transmitting mixer 27, which converts the IF signal into a microwave signal by using a local signal from a transmitting-side local oscillator 22 composed of a VCO, the frequency of which is respond to an SC signal voltage, and transmits the microwave signal to the succeeding station.

In the second embodiment, because the PLL for suppressing the FM components is provided in a portion succeeding the SD control loop, the PLL control loop is free from a signal propagation delay time caused by a substantial distance between the first mixer of the S-branch receiver unit and the hybrid combiner contained in the M-branch receiver unit as caused in the first embodiment. Thus, the PLL control can be performed without being affected by such a delay time. Because the followability of the PLL for the frequency deviation of the second IF received signal can be determined only by the loop filter, a reduction of the SC signal bandwidth can be prevented.

Figure 6:
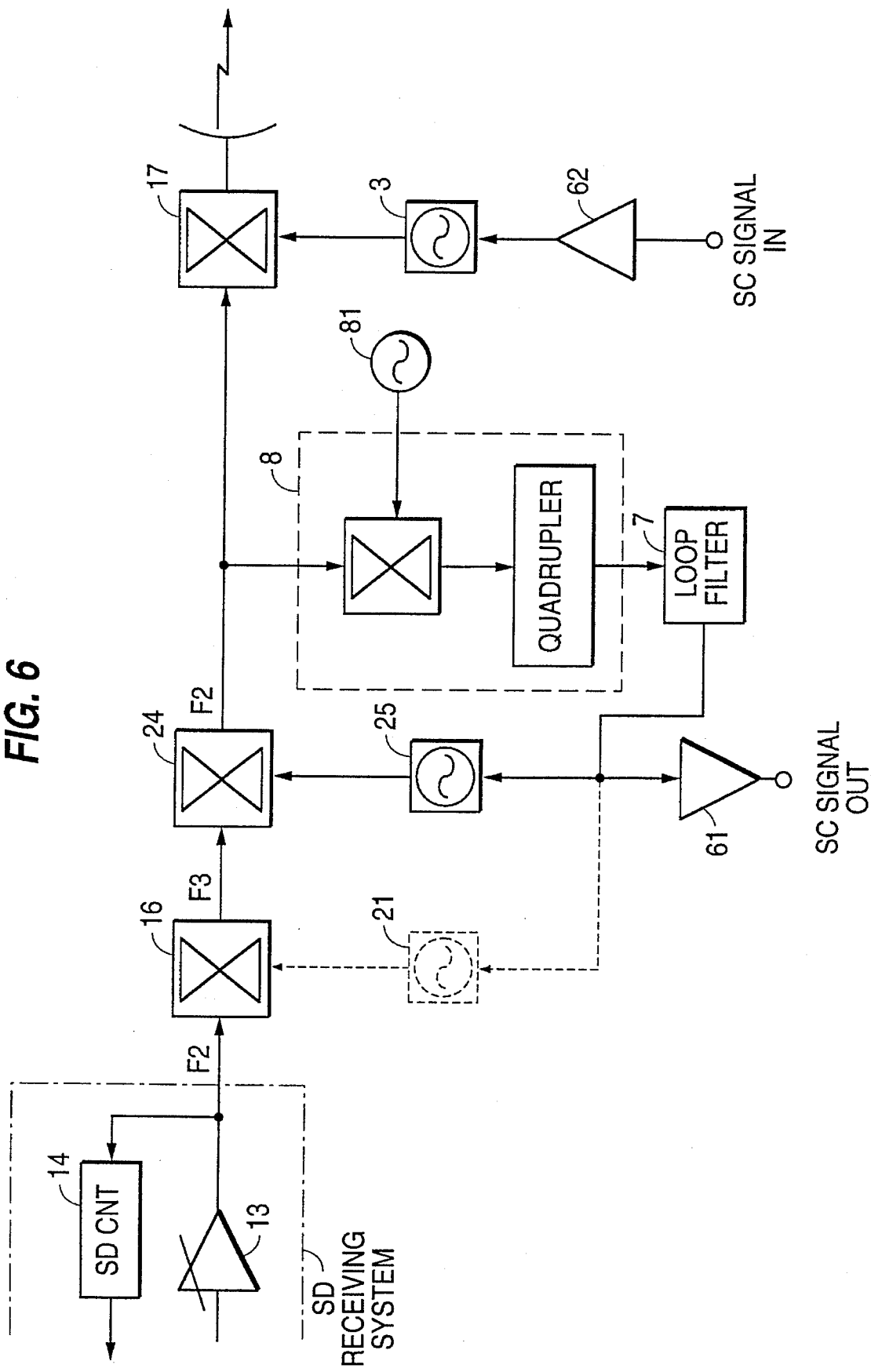
FIG. 6 illustrates the construction of a third embodiment of the intermediate relay station of the present invention employing the SD reception system.

FIG. 6 illustrates a third embodiment of the present invention achieved based on the second embodiment. The third embodiment is advantageous when the transmitting-side local frequency used for converting the second IF signal into a transmitting microwave frequency is predetermined. Because the second embodiment converts the first IF frequency F2 into the second IF frequency F3 before converting into the transmitting microwave frequency, the transmitting-side local oscillation frequency used for converting the second IF frequency F3 into the transmitting microwave frequency must be varied by the difference between the first IF frequency F2 and the second IF frequency F3. In other words, the transmitting-side local oscillation frequency used in the second embodiment is different from the transmitting-side local oscillation frequency used in the first embodiment which convert the first IF frequency directly into the transmitting microwave frequency. If the transmitting-side local oscillation frequency is predetermined to a specific value, the second embodiment may fail to achieve such a transmitting-side local oscillation frequency.

To eliminate such a drawback, the third embodiment further comprises a third receiving-side mixer 24 provided between a second receiving-side mixer 16 and a transmitting mixer 17, as shown in FIG. 6. The third receiving-side mixer 24 converts the second IF signal back into a first IF signal, and then outputs the first IF signal for a transmitting mixer 17. A PLL is constructed so that the frequency of the first IF signal from the third receiving-side mixer 24 becomes equal to the fixed frequency of the first IF reference signal outputted by an oscillator 81. Thereby, the third embodiment achieves a predetermined transmitting-side local frequency, as well as suppression of the FM components of the IF signal for the transmitting mixer 17. The PLL control of the oscillating frequency for suppressing the FM components can be performed by either a second receiving-side local oscillator 21 illustrated in broken lines or a third receiving-side local oscillator 25 illustrated in solid lines, achieving the same effects.

What is claimed is:

1. An intermediate relay station of a microwave communication system, which uses a microwave carrier that is modulated by a main signal being transmitted and frequency-modulated by a service channel signal for monitoring and controlling said microwave communication system, and which comprises a plurality of intermediate relay stations for receiving the main signal by using a space diversity system and relaying the main signal by heterodyne relay, said intermediate relay station comprising:

a pair of receiving mixer means for frequency-converting first and second received microwave signals received by two antennas apart from each other, each of said first and second received microwave signals containing a frequency modulation component, into first and second intermediate frequency received signals by using a receiving-side local oscillation signal produced by a receiving-side local oscillator;

phase shifter means for shifting the phase of said first intermediate frequency received signal so that a phase difference between carriers of said first and second intermediate frequency received signals exists, the phase difference arising from the difference of propagation paths of the microwave carriers, is compensated;

adding means for adding the first intermediate frequency received signal whose phase has been shifted and the second intermediate frequency received signal whose phase has not been shifted, in order to generate a third intermediate frequency received signal;

fixed-frequency oscillating means for generating an intermediate frequency reference signal having a fixed frequency equal to a frequency of a carrier of said third intermediate frequency received signal;

phase difference detecting means for inputting said intermediate frequency reference signal and said third intermediate frequency received signal, and for generating a control signal corresponding only to a frequency deviation in said third intermediate frequency received signal, the frequency deviation arising from the frequency modulation with said service channel signal;

a VCO device used as said receiving-side local oscillator, responsive to said control signal, generating said receiving-side local oscillation signal whose frequency varies so that each of the first and second intermediate frequency received signals is frequency-locked to the frequency of said intermediate frequency reference signal from said fixed-frequency oscillating means;

service channel signal extracting means for outputting said control signal as said service channel signal; and transmitting mixer means for converting the third intermediate frequency received signal, having a reduced frequency modulation component, into a transmitting microwave.

2. An intermediate relay station according to claim 1, wherein said microwave carrier is modulated with said main signal by multi-phased shift keying modulation.

3. An intermediate relay station according to claim 2, wherein said phase difference detecting means comprises:

a quadrature demodulator device, multiplying said third intermediate frequency received signal by said intermediate frequency reference signal and by another intermediate frequency reference signal having a phase shifted by $\pi/2$ from the phase of said intermediate frequency reference signal so as to generate phase difference signals, and outputting said phase difference signals to two channels including Channel I and Channel Q; and a multiplying device, multiplying a frequency of an output from said quadrature demodulator device so as to eliminate a phase shift keying modulation component, and outputting said control signal corresponding only to a frequency deviation in said third intermediate frequency received signal, the frequency deviation arising from the frequency modulation with said service channel signal.

4. An intermediate relay station according to claim 1, wherein said phase shifter means includes an endless phase shifter provided between said receiving-side local oscillator outputting said receiving-side local oscillation signal and one of said pair of receiving mixer means.

5. An intermediate relay station of a microwave communication system, which uses a microwave carrier that is modulated by a main signal being transmitted and frequency-modulated by a service channel signal for monitoring and controlling said microwave communication system, and which comprises a plurality of intermediate relay stations for receiving the main signal by using a space diversity system and relaying the main signal by heterodyne relay, said intermediate relay station comprising:

a pair of first receiving mixer means for frequency-converting first and second received microwave signals received by two antennas apart from each other, each of said first and second received microwave signals containing a frequency modulation component, into first and second intermediate frequency received signals by using a first receiving-side local oscillation signal produced by a first receiving-side local oscillator;

phase shifter means for shifting the phase of said first intermediate frequency received signal so that a phase difference between carriers of said first and second intermediate frequency received signals, the phase difference arising from the difference of propagation paths of the microwave carriers, is compensated;

adding means for adding the first intermediate frequency received signal whose phase has been shifted and the second intermediate frequency received signal whose phase has not been shifted, in order to generate a third intermediate frequency received signal;

second receiving mixer means for frequency-converting said third intermediate frequency received signal from said adding means into a fourth intermediate received signal by using a second receiving-side local oscillation signal produced by a second receiving-side local oscillator;

fixed-frequency oscillating means for generating a first intermediate frequency reference signal having a fixed frequency equal to a frequency of a carrier of said fourth intermediate frequency received signal;

phase difference detecting means for inputting said first intermediate frequency reference signal and said fourth intermediate frequency received signal, and for generating a control signal corresponding only to a frequency deviation in said fourth intermediate frequency received signal, the frequency deviation arising from the frequency modulation with said service channel signal;

a VCO device used as said receiving-side local oscillator, responsive to said control signal, generating said receiving-side local oscillation signal whose frequency varies so that the fourth intermediate frequency received signal is frequency-locked to the frequency of said first intermediate frequency reference signal from said fixed-frequency oscillating means;

service channel signal extracting means for outputting said control signal as said service channel signal; and transmitting mixer means for converting the fourth intermediate frequency received signal, in which a frequency modulation component has been reduced into a transmitting microwave.

6. An intermediate relay station according to claim 5, wherein said microwave carrier is modulated with said main signal by multi-phased shift keying modulation.

7. An intermediate relay station according to claim 6, wherein said phase difference detecting means comprises:

a quadrature demodulator device, multiplying said fourth intermediate frequency received signal by said first intermediate frequency reference signal and by a second intermediate frequency reference signal having a phase shifted by $\pi/2$ from the phase of said first intermediate frequency reference signal so as to generate phase difference signals, and outputting said phase difference signals to two channels including Channel I and Channel Q; and a multiplying device, multiplying a frequency of an output from said quadrature demodulator device so as to eliminate a phase shift keying modulation component, and outputting said control signal corresponding only to a frequency deviation in said fourth intermediate frequency received signal, the frequency deviation arising from the frequency modulation with said service channel signal.

8. An intermediate relay station of a microwave communication system, comprising:

first and second receiving mixer means for frequency-converting first and second received microwave signals into first and second intermediate frequency received signals;

phase shifter means for shifting the phase of said first intermediate frequency received signal so that a phase difference between carriers of said first and second intermediate frequency received signals, the phase difference arising from the difference of propagation paths of the microwave carriers, is compensated;

adding means for adding the first intermediate frequency received signal whose phase has been shifted and the second intermediate frequency received signal whose phase has not been shifted, in order to generate a third intermediate frequency received signal;

fixed-frequency oscillating means for generating an intermediate frequency reference signal having a fixed frequency equal to a frequency of a carrier of said third intermediate frequency received signal;

phase difference detecting means for inputting said intermediate frequency reference signal and said third intermediate frequency received signal, and for generating a control signal corresponding only to a frequency deviation in said third intermediate frequency received signal, the frequency deviation arising from a frequency modulation with a service channel signal;

a VCO device, responsive to said control signal, generating a receiving-side local oscillation signal whose frequency varies so that each of the first and second intermediate frequency received signals is frequency-locked to the frequency of said intermediate frequency reference signal from said fixed-frequency oscillating means; and transmitting mixer means for converting the third intermediate frequency received signal, in which a frequency modulation component has been reduced into a transmitting microwave.

9. An intermediate relay station of a microwave communication system, comprising:

a pair of first receiving mixer means for frequency-converting first and second received microwave signals received by two antennas apart from each other into first and second intermediate frequency received signals;

phase shifter means for shifting the phase of said first intermediate frequency received signal so that a phase difference between carriers of said first and second intermediate frequency received signals, the phase difference arising from the difference of propagation paths of the microwave carriers, is compensated;

adding means for adding the first intermediate frequency received signal whose phase has been shifted and the second intermediate frequency received signal whose phase has not been shifted, in order to generate a third intermediate frequency received signal;

second receiving mixer means for frequency-converting said third intermediate frequency received signal from said adding means into a fourth intermediate frequency received signal;

fixed-frequency oscillating means for generating a first intermediate frequency reference signal having a fixed-frequency equal to a frequency of a carrier of said fourth intermediate frequency received signal;

phase difference detecting means for inputting said intermediate frequency reference signal and said fourth intermediate frequency received signal, and for generating a control signal corresponding only to a frequency deviation in said fourth intermediate frequency received signal, the frequency deviation arising from a frequency modulation with a service channel signal;

a VCO device, responsive to said control signal, generating a receiving-side local oscillation signal whose frequency varies so that the fourth intermediate frequency received signal is frequency-locked to said first intermediate frequency reference signal from said fixed-frequency oscillating means; and transmitting mixer means for converting the fourth intermediate frequency received signal, having a reduced frequency modulation component, into a transmitting microwave.

10. An intermediate relay station of a microwave communication system, which uses a microwave carrier that is modulated by a main signal being transmitted and frequency-modulated by a service channel signal for monitoring and controlling said microwave communication system, and which comprises a plurality of intermediate relay stations for receiving the main signal by using a space diversity system and relaying the main signal by heterodyne relay, said intermediate relay station comprising:

a pair of first receiving mixer means for frequency-converting first and second received microwave signals received by two antennas apart from each other, each of said first and second microwave signals containing a frequency modulation component, into first and second intermediate frequency received signals by using a first receiving-side local oscillation signal produced by a first receiving-side local oscillator;

phase shifter means for shifting the phase of said first intermediate frequency received signal so that a phase difference between carriers of said first and second intermediate frequency received signals, the phase difference arising from the difference of propagation paths of the microwave carriers, is compensated;

adding means for adding the first intermediate frequency received signal whose phase has been shifted and the second intermediate frequency received signal whose phase has not been shifted, in order to generate a third intermediate frequency received signal;

second receiving mixer means for frequency-converting said third intermediate frequency received signal from said adding means into a fourth intermediate frequency received signal by using a second receiving-side local oscillation signal produced by a second receiving-side local oscillator;

third receiving mixer means for frequency-converting the fourth intermediate frequency received signal into the first intermediate frequency received signal;

fixed-frequency oscillating means for generating a first intermediate frequency reference signal having a frequency equal to a frequency of a carrier of said first intermediate frequency signal from said third receiving mixer means;

phase difference detecting means for inputting said first intermediate frequency reference signal and said first intermediate frequency signal, and for generating a control signal corresponding only to a frequency deviation in said first intermediate frequency signal, the frequency deviation arising from the frequency modulation with said service channel signal;

a VCO device used as said second receiving-side local oscillator, responsive to said control signal, generating said second receiving-side local oscillation signal whose frequency varies so that the first intermediate frequency signal is frequency-locked to the frequency of said first intermediate frequency reference signal from said fixed-frequency oscillating means;

service channel signal extracting means for outputting said control signal as said service channel signal; and transmitting mixer means for converting said first intermediate frequency signal, in which a frequency modulation component has been reduced into a transmitting microwave.

11. An intermediate relay station of a microwave communication system, which uses a microwave carrier that is modulated by a main signal being transmitted and frequency-modulated by a service channel signal for monitoring and controlling said microwave communication system, and which comprises a plurality of intermediate relay stations for receiving the main signal by using a space diversity system and relaying the main signal by heterodyne relay, said intermediate relay station comprising:

a pair of first receiving mixer means for frequency-converting first and second received microwave signals received by two antennas apart from each other, each of said first and second microwave signals containing a frequency modulation component, into first and second intermediate frequency received signals by using a first receiving-side local oscillation signal produced by a first receiving-side local oscillator;

phase shifter means for shifting the phase of said first intermediate frequency received signal so that a phase difference between carriers of said first and second intermediate frequency received signals, the phase difference arising from the difference of propagation paths of the microwave carriers, is compensated;

adding means for adding the first intermediate frequency received signal whose phase has been shifted and the second intermediate frequency received signal whose phase has not been shifted, in order to generate a third intermediate frequency received signal;

second receiving mixer means for frequency-converting said third intermediate frequency received signal from said adding means into a fourth intermediate frequency received signal;

third receiving mixer means for frequency-converting the fourth intermediate frequency received signal into a first intermediate frequency signal by using a third receiving-side local oscillation signal produced by a third receiving-side local oscillator;

fixed-frequency oscillating means for generating a first intermediate frequency reference signal having a frequency equal to a frequency of a carrier of said first intermediate frequency signal from said third receiving mixer means;

phase difference detecting means for inputting said first intermediate frequency reference signal and said first intermediate frequency signal, and for generating a control signal corresponding only to a frequency deviation in said first intermediate frequency signal, the frequency deviation arising from the frequency modulation with said service channel signal;

a VCO device used as said third receiving-side local oscillator, responsive to said control signal, generating said third receiving-side local oscillation signal whose frequency varies so that the first intermediate frequency signal is frequency-locked to the frequency of said first intermediate frequency reference signal from said fixed-frequency oscillating means;

service channel signal extracting means for outputting said control signal as said service channel signal; and transmitting mixer means for converting said first intermediate frequency signal, in which a frequency modulation component has been reduced into a transmitting microwave.

* * * * *